US009129455B2

(12) United States Patent
Mitchell

(10) Patent No.: US 9,129,455 B2

(45) Date of Patent: Sep. 8, 2015

(54) SYSTEM AND METHOD TO ENABLE PASSIVE ENTRY

(75) Inventor: Timothy K. Mitchell, Sylvania, OH (US)

(73) Assignee: FCA US LLC, Auburn Hills, MI (US)

(*) Notice: Subject to any disclaimer, the term of this patent is extended or adjusted under 35 U.S.C. 154(b) by 536 days.

(21) Appl. No.: 13/400,937

(22) Filed: Feb. 21, 2012

(65) Prior Publication Data

US 2013/0214900 A1 Aug. 22, 2013

(51) Int. Cl.
*G06F 7/04* (2006.01)
*G07C 9/00* (2006.01)

(52) U.S. Cl.
CPC .. *G07C 9/00309* (2013.01); *G07C 2009/00388* (2013.01); *G07C 2209/65* (2013.01)

(58) Field of Classification Search
USPC ............ 340/5.61, 1.1, 5.1, 9.11, 10.3, 10.32, 340/10.1, 10.41
See application file for complete search history.

(56) References Cited

U.S. PATENT DOCUMENTS

| | | | | |
|---|---|---|---|---|
| 6,028,537 | A | 2/2000 | Suman et al. | |
| 6,384,714 | B2 * | 5/2002 | Thompson et al. | 340/146.2 |
| 6,725,014 | B1 * | 4/2004 | Voegele | 455/41.2 |
| 6,816,089 | B2 | 11/2004 | Flick | |
| 6,982,628 | B1 * | 1/2006 | Hacker et al. | 340/10.2 |
| 7,221,256 | B2 | 5/2007 | Skekloff et al. | |
| 7,778,213 | B2 | 8/2010 | Alrabady et al. | |
| 2001/0028296 | A1 * | 10/2001 | Masudaya | 340/5.61 |
| 2002/0101366 | A1 | 8/2002 | Flick | |
| 2003/0210128 | A1 | 11/2003 | Dix | |
| 2004/0077366 | A1 * | 4/2004 | Panasik et al. | 455/514 |
| 2005/0046545 | A1 | 3/2005 | Skekloff et al. | |
| 2006/0145809 | A1 * | 7/2006 | Crowhurst | 340/5.62 |
| 2006/0176177 | A1 * | 8/2006 | Heinze et al. | 340/572.1 |

(Continued)

FOREIGN PATENT DOCUMENTS

| | | | |
|---|---|---|---|
| DE | 19639888 | C1 | 11/1997 |
| EP | 0285419 | A2 | 10/1988 |

(Continued)

OTHER PUBLICATIONS

International Search Report dated May 7, 2013 for International Application No. PCT/US2013/025826, International Filing Date Feb. 13, 20913.

(Continued)

*Primary Examiner* — Naomi Small
(74) *Attorney, Agent, or Firm* — Ralph E Smith

(57) ABSTRACT

A passive entry system is disclosed. The system comprises an unlocking module that performs a key operation in a keyless environment and a plurality of fobs configured to trigger the unlocking module to perform the key operation. each fob has a unique value associated thereto. The unlocking module determines a range of identification values, generates an authentication request packet based on the range, of identification values, and broadcasts the request packet. Each fob receives the request packet; and determines whether the unique identification value of the corresponding fob falls within the range of identification values. The fob also generates a response packet if the unique identification value falls within the range of identification values and transmits the response packet to the unlocking module. The unlocking module receives the response packets from the fobs, and performs the key operation based on one of the received response packets.

20 Claims, 6 Drawing Sheets

(56) References Cited

U.S. PATENT DOCUMENTS

| | | | | |
|---|---|---|---|---|
| 2007/0200678 | A1* | 8/2007 | Sukegawa et al. | 340/10.32 |
| 2007/0279186 | A1 | 12/2007 | Skekloff et al. | |
| 2008/0111661 | A1* | 5/2008 | Lin et al. | 340/10.1 |
| 2008/0122594 | A1* | 5/2008 | Brecht et al. | 340/426.11 |
| 2008/0205320 | A1 | 8/2008 | Alrabady et al. | |
| 2009/0015373 | A1 | 1/2009 | Kelly et al. | |
| 2009/0066477 | A1 | 3/2009 | Kaihori et al. | |
| 2009/0067345 | A1* | 3/2009 | Sakamoto et al. | 370/254 |
| 2009/0212978 | A1 | 8/2009 | Ramseyer | |
| 2009/0284345 | A1* | 11/2009 | Ghabra et al. | 340/5.61 |
| 2010/0182128 | A1 | 7/2010 | Kim et al. | |
| 2010/0212527 | A1* | 8/2010 | McCaan et al. | 102/215 |
| 2011/0025460 | A1 | 2/2011 | Farrell et al. | |

FOREIGN PATENT DOCUMENTS

| | | | |
|---|---|---|---|
| EP | 0955217 | A2 | 11/1999 |
| WO | 2004053809 | A2 | 6/2004 |
| WO | 2008103540 | A1 | 8/2008 |
| WO | 2008124795 | A1 | 10/2008 |

OTHER PUBLICATIONS

Written Opinion dated May 7, 2013 for International Application No. PCT/US2013/025826, International Filing Date Feb. 13, 20913.

* cited by examiner

SYSTEM AND METHOD TO ENABLE PASSIVE ENTRY

FIELD OF THE INVENTION

The present disclosure relates to a system and method for enabling passive entry for a plurality of objects, including a fleet of vehicles.

BACKGROUND

Passive, or keyless, entry systems in vehicles are gaining in popularity. In previous systems, there was a one-to-one communication that took place between the vehicle and the keyless entry device, i.e., the fob. In present passive entry systems, there is a "handshake" operation that must take place between the fob and the vehicle in order to unlock the vehicle. An issue arises, however, when multiple fobs are configured to passively unlock a vehicle, as the vehicle can only communicate with one fob at a time. Further, the complexity of this issue becomes more glaring when multiple fobs are to be configured to interface with a fleet of vehicles.

One typical solution for passive entry is to marry a fob to the fleet of vehicles and to have the fob talk during a predetermined time slot. In these systems, the number of fobs that can be used is limited by the number of time slots in a transmission period, e.g., up to 8 time slots. The only way to increase the number of fobs in the fleet is to increase the transmission period. Consumers, however, are accustomed to the keyless entry working in less than a second. Therefore, increasing the transmission period and the amount of time slots in order to increase the amount of fobs that can unlock a fleet of vehicles is not a desirable solution.

Another drawback with the current passive entry solutions is that marrying fobs to a fleet of vehicles does not allow new cars to be added to the fleet without having to configure the vehicle to work with the old fobs or issuing new fobs for the new vehicles. This is problematic in the police vehicle fleets or taxi service fleets, where new vehicles can be added to the fleet every year.

Thus, there is a need for an efficient system for enabling a plurality of fobs to passively unlock and lock a fleet of vehicles without having to marry the fobs to the fleet of vehicles.

SUMMARY

In one aspect of the disclosure a passive entry system is disclosed. The system comprises an unlocking module configured to perform a key operation in a keyless environment and a plurality of fobs configured to trigger the unlocking module to perform the key operation, each fob having a unique identification value associated thereto. The unlocking module comprises a control module that determines a range of identification values, including a start of range value and an end of range value that generates an authentication request packet based on the range of identification values, and that broadcasts the request packet. Each fob from the plurality of fobs comprises a fob transceiver that receives the request packet; and a response module that determines whether the unique identification value of the corresponding fob falls within the range of identification values. The response module also generates a response packet if the unique identification value falls within the range of identification values. The fob transceiver transmits the response packet to the first transceiver. The control module of the unlocking module is further configured to receive response packets from the plurality of fobs, and to perform the key operation based on one of the received response packets.

In another aspect of the disclosure, a passive entry method is disclosed. The method comprises determining, at an unlocking module, a range of identification values, including a start of range value and an end of range value, generating, at the unlocking module, an authentication request packet based on the range of identification values and broadcasting the request packet to a plurality of fobs, each fob having a unique identification value associated thereto. The method further comprises receiving, at one of the fobs of the plurality of fobs, the request packet and determining, at the fob, whether the unique identification value of the corresponding fob falls within the range of identification values. The method further comprises generating, at the fob, a response packet if the unique identification value falls within the range of identification values and transmitting the response packet to unlocking module. The method further comprises receiving response packets from the plurality of fobs, and performing a key operation based on one of the received response packets.

Further areas of applicability of the teachings of the present disclosure will become apparent from the detailed description, claims and the drawings provided hereinafter. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
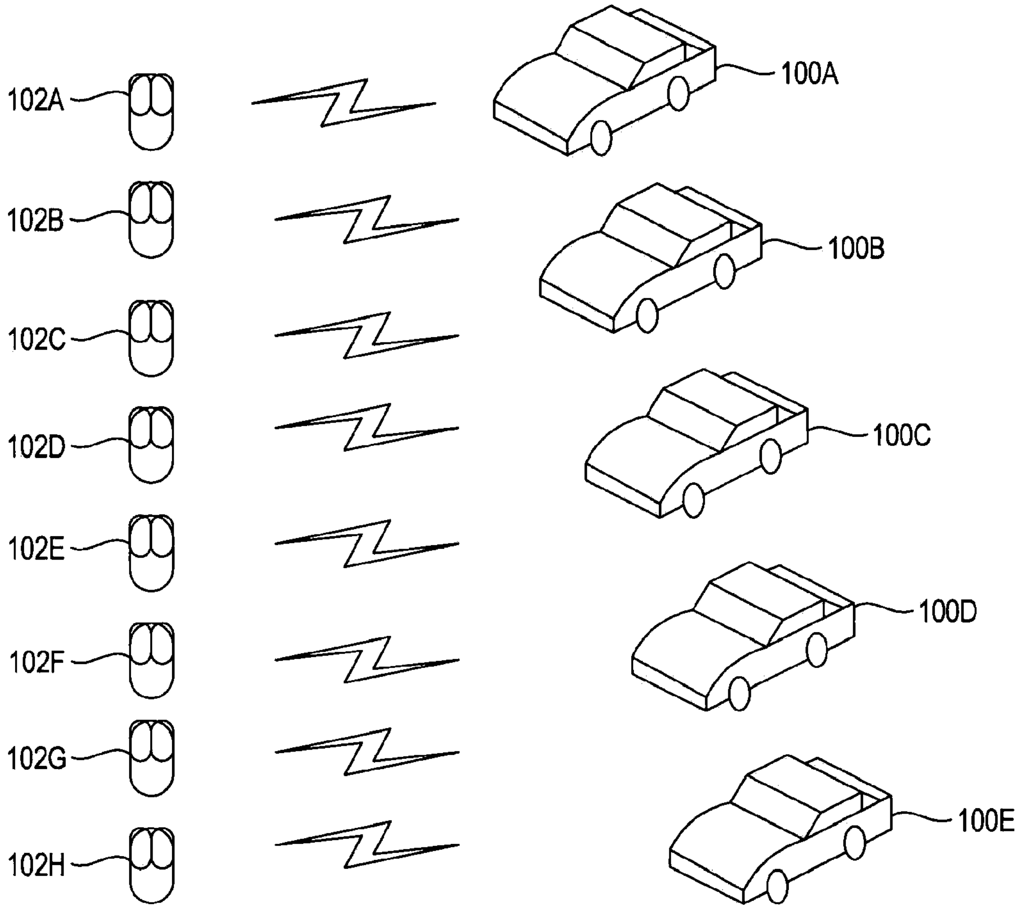
FIG. 1 is a drawing illustrating an exemplary fleet of vehicles and a plurality of fobs for unlocking, locking, and starting the vehicles.

FIG. 1 illustrates a fleet of vehicles 100 and a plurality of key fobs 102A, 102B, 102C, 102D, 102E, 102F, 102G, 102H (the fobs will herein be referred to as 102) in communication with the fleet of vehicles 100A, 100B, 100C, 100D, and 100E (the vehicles will herein be referred to as 100). Each vehicle 100 can be unlocked, locked, and/or started using any of the key fobs 102. Accordingly, multiple users can unlock any of the vehicles 100. For example, the vehicles may be part of a fleet of police vehicles, where various police personnel may use the different police vehicles interchangeably. The police personnel may each keep one key fob 102 and use it with any of the vehicles 100 in the fleet. While the environment of FIG. 1 illustrates a fleet of vehicles, it is appreciated that the disclosed key fobs 102 and the unlocking modules discussed below, can be used in a variety of different environments, including an apartment building or an office building or any environment that it where multiple lockable units are accessed by multiple people. Further, the foregoing can be used in a shared computing environment, where multiple users all use a plurality of computers.

Figure 2:
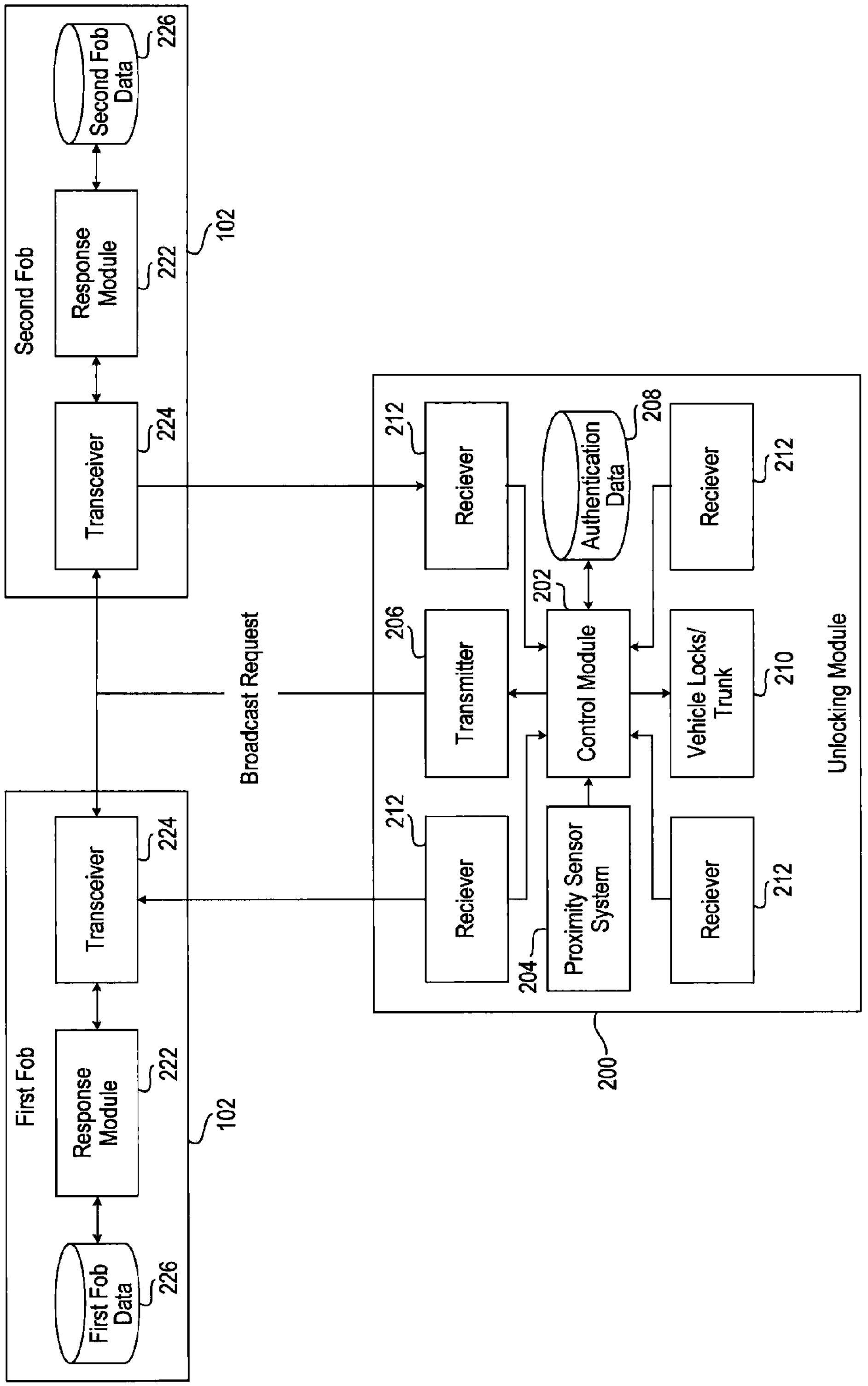
FIG. 2 is a block diagram illustrating exemplary components of a passive entry system.

Referring now to FIG. 2, an exemplary passive entry system is depicted. The passive entry system is comprised of an unlocking module 200, a first key fob 102, and a second key fob 102. The exemplary unlocking module 200 can be integrated in a vehicle 100 in a fleet of vehicles. It is appreciated that each vehicle in the fleet of vehicles 100 includes a similar unlocking module 200. Further, it is appreciated that the unlocking module 200 can be integrated into any suitable environment where multiple users access multiple objects, including, for example, an apartment complex or a secured building. For purposes of explanation, however, the disclosure will reference a vehicle 100 in a fleet of vehicles. It is understood that the disclosure can be applied to any of the foregoing environments as well.

The unlocking module 200 includes a control module 202, a proximity sensor system 204, a transmitter 206, and one or more receivers 212. The unlocking module 200 may further include a memory 208 that stores authentication data. The control module 202 is in operative communication with the locks/trunk/ignition 210 of the vehicle 100. When the control module 202 determines that a valid key fob 102 is in the proximity of the vehicle 100, the control module 202 performs a key operation. A key operation is any operation to trigger a function that would ordinarily be performed by a key, such as unlocking or locking a door of the vehicle 100, popping the trunk of the vehicle 100, or starting the vehicle 100. In an exemplary embodiment, the control module 202 performs a key operation by sending a signal to one or more of the locks or trunk 210 of the vehicle 100, the signal indicating that the locks or trunk are to be unlocked or opened. Similarly, when the control module 202 determines that a user is in the vehicle 100 and that a valid fob 102 is in the vehicle 100, the control module 202 will transmit a signal to the ignition of the vehicle indicating to the vehicle 100 to start the engine.

To determine the validity of the key fob 102, the control module 202 generates and broadcasts a request packet. The request packet is generated using the authentication data stored in the memory 208. The control module 202 generates and broadcasts the request packet upon receiving a proximity signal indicating that a user or fob 102 is in proximity to the vehicle.

The proximity sensor system 204 is comprised of one or more sensors that detect a fob 102 or a user in the presence of the vehicle. For example, the proximity sensor system 204 may be comprised of a plurality of touch sensors integrated into the door handles of the vehicle 100, such that when the user touches one of the vehicle handles, the proximity sensor system 204 generates a proximity signal that is communicated to the control module 202, the proximity signal indicating an object has been detected in the proximity of the vehicle 100. It is noted that in a vehicle 100, the plurality of proximity sensors 204 can be placed in different zones of the vehicle 100. For example, proximity sensors can be placed in the front right door handle of a vehicle 100, the front left door handle of the vehicle 100, the back right door handle of the vehicle 100, the back left door handle of the vehicle 100, and the trunk button of the vehicle 100. In the example, when the user engages one of the door handles, e.g., the handle of the front right door, the proximity sensor of the front right door handle will indicate that an object has been detected at the front right zone of the vehicle. It is appreciated that the proximity sensor system 204 may be configured as sensors that detect if the fob 102 is in proximity to the vehicle, rather than the user.

Figure 3:
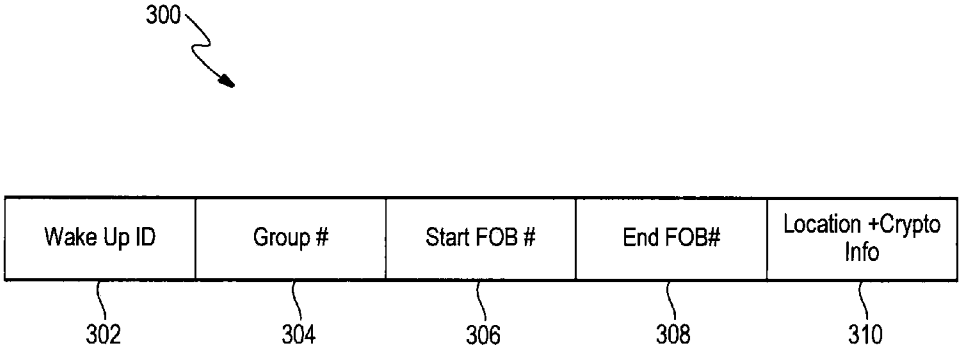
FIG. 3 is a drawing illustrating exemplary fields of a request packet.

Upon receiving a proximity signal from the proximity sensor system 204, the control module 202 will generate a request packet indicating a request for all key fobs 102 receiving the request to authenticate with the unlocking module 200. FIG. 3 illustrates an exemplary structure of a request packet 300. The request packet 300 includes fields for a start fob identification value 306 and an end fob identification value 308 that collectively indicate a range of fob identification values. As will be discussed below, each fob 102 has a corresponding unique identification value corresponding thereto. For example, a unique identification value can be any number between 0 and $2^n-1$, where N is the maximum amount of bits in the unique identification value. The request packet 300, including the range of fob identification values represented by a start value and an end value, is broadcasted to all proximate fobs 102. If the unique identification value of the fob 102 falls within the range of values in the request packet, the fob 102 will generate and transmit a response packet to the unlocking module 200. If the unique identification value of a fob 102 does not fall within the range of values, the fob 102 does not respond to the request packet. As will be discussed in greater detail below, if more than one fob 102 responds or no fobs respond, the control module 202 will adjust the range of identification values and generate a new request value.

The request packet 300 may further include a wake-up ID field 302, a group ID field 304, and location information field 310. The wake-up ID field 302 stores a wake-up ID value. The wake-up ID value is a string of bits that indicates a relationship between the fob 102 and the vehicle 100. The wake-up ID triggers the fob 102 to analyze the rest of the request packet 300. For instance, the wake-up ID value can be unique to a manufacturer, such that any vehicle made by the manufacturer would be assigned the same wake-up ID. The wake-up ID value could also be a value assigned to the purchaser of a fleet of vehicles, e.g., a police department or a taxi service. The wake-up ID can be of predetermined length, e.g., 1 byte. The wake-up ID value can be obtained from the memory 208 storing the authentication data.

The group ID field 304 stores a group ID value. The group ID field 304 indicates a group of vehicles that the fob 102 is configured to communicate with. For instance, the group ID field 304 may be two bits long. In this example, the fob 102 would belong to one of four groups. It is appreciated that the fob 102 is configured to compare the group ID value to the fob data to determine whether the fob 102 belongs to the same group as the vehicle 102 broadcasting the request packet. If a fob does not belong to a group indicated in the group ID field by the group ID value, the fob 102 does not respond to the request packet. The group ID value can be obtained from the memory 208 storing the authentication data.

The location information field 310 stores location information indicating a location in relation to the vehicle, e.g., a zone of a vehicle, where the object, e.g., user or fob 102, was detected by the proximity sensor 204. As will be discussed below, the fob 102 will provide a response packet that includes a checksum that is encoded using the location information provided in the request packet 300. The control module 202 obtains the location information from the proximity sensor system 204.

It is appreciated that the request packet can include additional fields and may exclude one or more of fields described above. It is further noted that the length of the fields can vary depending on the environment of the unlocking module 200.

Referring back to FIG. 2, the control module 202 generates the request packet 300 and broadcasts the request packet 300 using a transmitter 206. The transmitter 206 is any suitable transmitter capable of broadcasting the request packet 300 to fobs 102 within a certain range, e.g., 3 meters.

The fobs 102 are configured to receive the request packet 300, to analyze the contents of the request packet 300, and to generate and transmit a response packet when the unique identification value of the fob 102 falls within the range of identification values indicated by the request packet 300. An exemplary fob 102 includes a response module 222, a transceiver 224, and a memory 226 storing fob data corresponding to the fob 102.

The transceiver 224 receives a broadcasted request packet 300 from the unlocking module 200. The transceiver 224 provides the broadcasted request packet to the response module 222. The response module 222 analyzes the contents of the request packet 300 to determine if a) the request packet 300 is intended for the particular fob 102 and b) if so, whether the unique identification value of the fob 102 falls within the range of identification values. As will be discussed below, the response module 222 can compare the wake-up ID value and the group ID value from the response packet 300 against the fob data stored in the memory 226 of the fob 102 to determine if the request packet 300 is intended for the receiving fob 102. The response module 222 can further retrieve the unique identification value of the fob 102 from the memory 226 of the fob 102 and compare the unique identification value with the range of identification values contained in the request packet 300. If the unique identification value of the fob falls within the range of identification values provided in the request packet 300, then the response module 222 generates a response packet having a checksum value in the payload. The checksum value can be generated using an encryption algorithm such as the Hitag 2 or the AES algorithms.

The response packet is transmitted by the transceiver 224 of the fob 102 to a receiver 212 of the unlocking module 200. As will be discussed below, in some embodiments the transceiver 224 may be configured to transmit the packet at a low frequency and for only a short distance, e.g., <1 meter. Further, the transceiver 224 can be further configured to transmit during one of a plurality of predetermined time slots. A time slot is a period during a transmission period. A transmission period is comprised of a plurality of time slots, each time slot having sufficient duration to transmit a packet. For instance, the transceiver 224 can be configured to transmit during a first time slot or during a second time slot depending on the value of the unique identification value of the corresponding fob 102. For example, if the unique identification value of the fob 102 is odd, the transceiver will transmit during the first time slot. If the unique identification value of the fob 102 is even, the transceiver 224 will transmit during the second time slot.

As was previously mentioned, the unlocking module 200 may include one or more receivers 212 dispensed throughout the vehicle 100. For example, receivers may be placed in the different zones of the vehicle, e.g., a first receiver 212 placed at the front right zone of the vehicle 100, a second receiver 212 placed at the front left zone of the vehicle 100, a third receiver 212 placed at the back right zone of the vehicle 100, a fourth receiver 212 placed at the back left zone of the vehicle 100, and a fifth receiver 212 placed at the trunk zone of the vehicle 100. In some embodiments, when a fob 102 transmits a response packet, the response packet only travels a short distance, e.g., <1 meter. Thus, typically only one response packet will be received from a particular fob 102. The receiver 212A that receives the response packet from the transmitting fob 102 and forwards the response packet to the control module 202. It is appreciated that the control module 202 can be configured to record a location corresponding to the received response packet, e.g., which receiver 212 provided the response packet. As will be discussed below, the control module 202 can be configured to verify that the location of the received response packet corresponds to the location of the object sensed by the proximity sensor system 204.

The control module 202 uses the response packet to verify the fob 102 transmitting the response packet. The control module 202 ensures that only one response packet was received in response to a request packet 300. The control module 202 is further configured to analyze the contents of the response packet to verify that the responding fob 102 has provided a valid checksum value. Once the control module 202 has verified the contents of the response packet, the control module 202 can send a signal to the locks/trunk/ignition of the vehicle 100.

Figure 4:
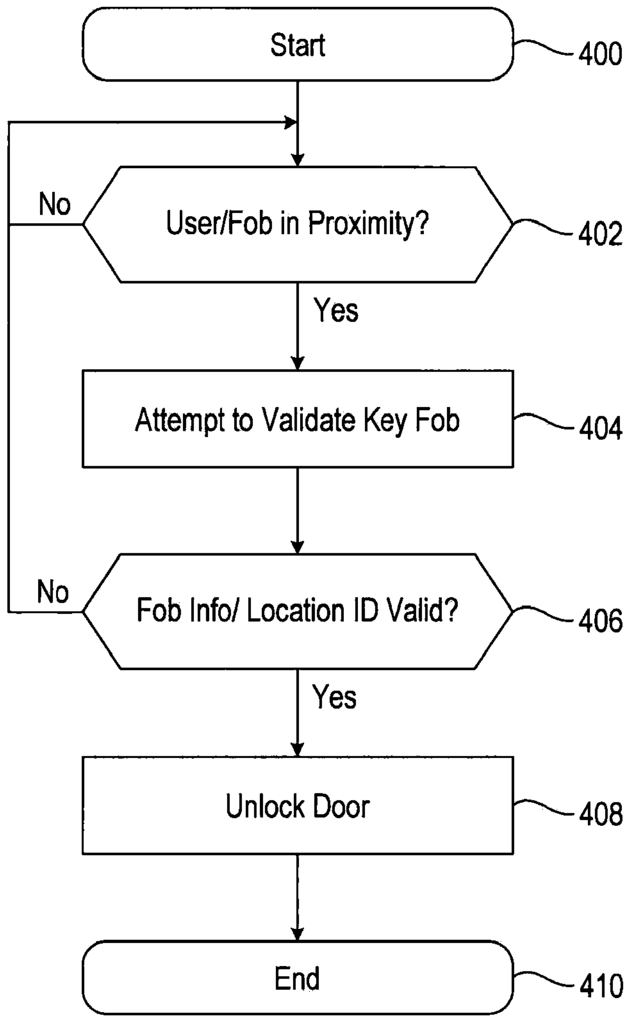
FIG. 4 is a flow chart illustrating exemplary steps for unlocking, locking or starting a car.

FIG. 4 illustrates an exemplary method that can be executed by the control module 202. The control module 202 waits for a proximity signal to be received from the proximity sensors, as shown at step 404. The control module 202 will remain in this loop until a proximity signal is received from the proximity sensor system 204. When the proximity signal is received, the control module 202 can note the location of the key fob or user, based on the proximity sensor generating the proximity signal. The control module 202 will then attempt to validate a key fob 102. As will be discussed below, the control module 202 will broadcast a request packet to all the key fobs 102 in the vicinity of the vehicle 100 and depending on the fob data of the key fobs 102, one or more key fobs 102 may generate a response packet. The control module 202 receives the response packet or packets. If a single response packet is received, the control module 202 analyzes the response data contained in the response packet. If more than one packet is received, the control module 202 creates a new request packet by adjusting the range of identification values indicated in the previously transmitted request packet, and broadcasts the new request packet. It is appreciated that the control module 202 will eventually validate a particular fob 102 or will be unable to validate any of the fobs 102. If a particular fob 102 is validated, the control module 202 will perform a key operation, as shown at step 412. Exemplary key operations may include unlocking a door, unlocking the trunk, or starting the engine.

Figure 5:
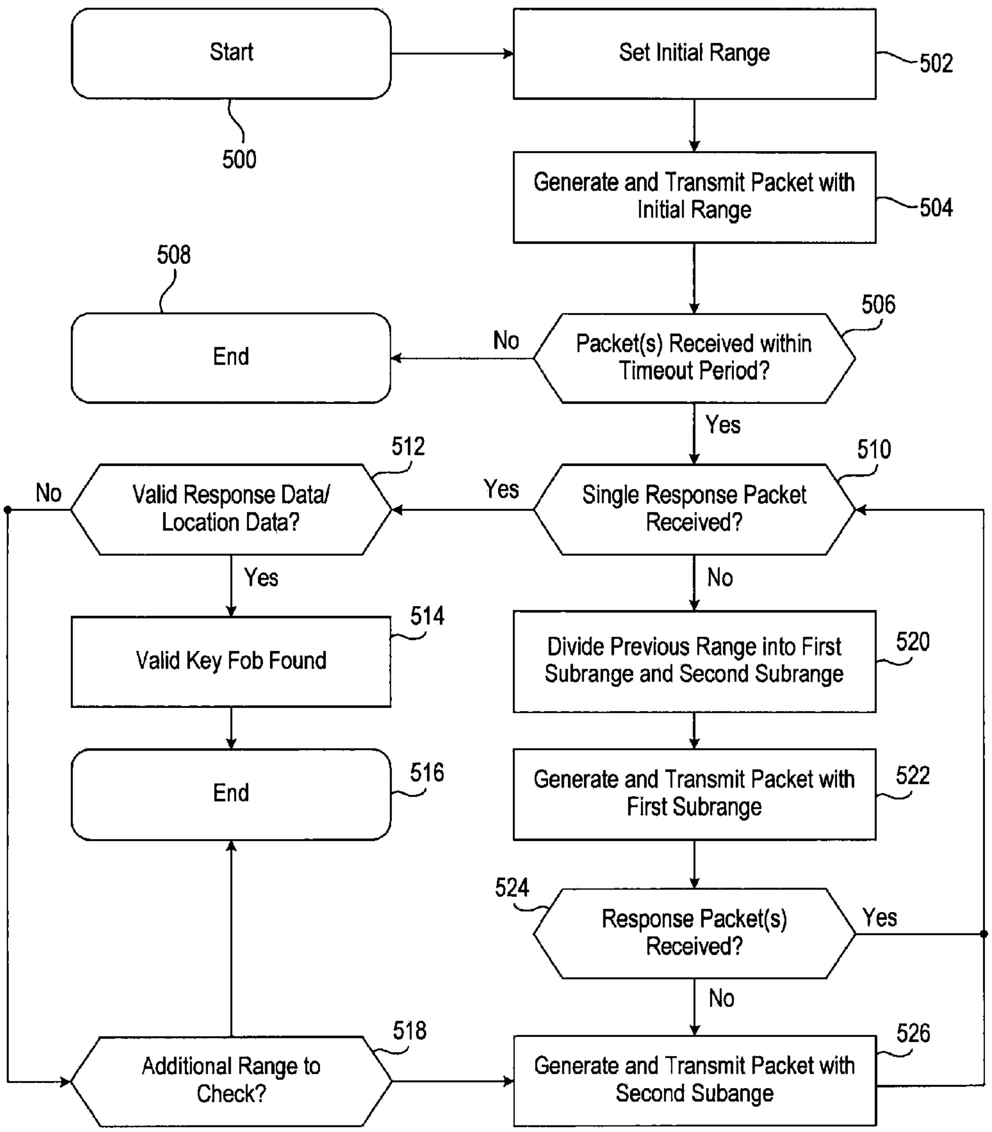
FIG. 5 a flow chart illustrating exemplary steps for validating a fob.

Referring now to FIG. 5, an exemplary method for verifying a fob is depicted. It is noted that the exemplary method is an iterative method and will continue to execute until a valid key fob 102 is verified or all the key fobs 102 in the vicinity of the vehicle have been ruled out as not being valid fobs 102, e.g., the key fob 102 is not found at the expected location. Further, it is envisioned that the control module 202 can execute more than one thread, such that each executing thread corresponds to a different time slot. For instance, two threads of the method may execute close to simultaneously. One thread analyzes fobs 102 having even unique identification values and the other thread analyzes fobs 102 having odd unique identification values. As was described above, the fobs 102 may be configured to transmit a response packet during a first time slot when the unique identification value is odd; and during a second time slot when the unique identification value is even.

As previously discussed, the control module 202 will attempt to verify a fob 102 upon receiving a proximity signal indicating an object within the vicinity of the vehicle 100. The proximity signal can be caused by, for example, a user touching a door handle of the vehicle 100. Upon receiving the proximity signal, the control module 202 will determine an initial range of identification values, as shown at step 502. As described above, the control module 502 attempts to validate key fobs 102 by broadcasting a range of identification values, whereby any key fobs 102 having a unique identification value falling within the range of identification values respond with a response packet. The initial range of values is the entire range of unique identification values, e.g., 0 to $2^n-1$ where N is the maximum number of bits in the range of values.

The control module 202 then generates and transmits a request packet 300, as shown at step 504. The control module 202 sets the start range value in the start range field 306 of the request packet 300 equal to 0 and the end range value in the end range field 308 equal to $2^n-1$. The control module 202 also sets the values of the other fields in the request packet 300. For example, the control module 202 may set the wake-up ID value in the wake-up ID field 302 and the group ID value in the group ID field 304. It is appreciated that the wake-up ID values and the group ID values can be the same across an entire fleet of vehicles 100, such that request packets 300 from any vehicle in the fleet of vehicles 100 all have the same wake-up ID value and group ID value contained therein. The wake-up ID value and the group ID value can be retrieved from the memory 208 storing the authentication data.

The control module 202 can also provide the location information in the location information field 310 of the request packet 300. The location information indicates the location on the vehicle where the proximity sensor system 204 detected an object. For example, the user may have touched the front left door of the vehicle 100. In this example, the location information may include a three bit code indicative of the front left door. As will be discussed below, the two or three bit code can be used by the response module 222 of a fob 102 to encrypt the payload of the response packet 300. Once the request packet 300 has been generated, the control module 202 broadcasts the request packet 300 using the transmitter 206.

The control module 202 then waits for a response packet to be received from one or more key fobs 102 by one or more of the receivers 212, as shown at step 506. The control module 202 will wait for a response packet for a predetermined amount of time, e.g., 500 ms. If no response packets are received, the control module 202 determines that there are no valid fobs 102 in the proximity of the vehicle 100 and will stop executing, as shown at step 508. If, however, one or more response packets are received from one or more fobs 102, the control module 202 will determine whether only one response packet was received, or whether multiple response packets were received, as shown at step 510.

As previously indicated, the received response packets are indicative of the fobs 102 having unique identification values falling within the current range of identification values indicated in the most recently broadcasted request packet 300. Thus, if only one response packet is received, only one fob is determined to be within the current range of identification values. In this scenario, the control module 202 will decode the payload of the response packet, which includes the encoded checksum value. It is appreciated that in some embodiments the response module 222 of the fob 102 encodes a predetermined value, e.g., a checksum value, using the received location value as a key for the encoding and an encryption algorithm, e.g., Hitag 2.

The control module 202 will decode the payload of the response packet using the location code corresponding to the receiver 212 that received the response packet to attempt to validate the response packet. If the payload is successfully decoded, e.g., the decoded checksum value equals the expected checksum value; the response packet is determined to be a valid response packet, as shown at step 512. In this scenario, the fob 102 transmitting the response packet is validated, as shown at step 514.

If, however, the payload of the response packet is not successfully validated, the control module 202 then determines if the entire range of identification values has been exhausted, as shown at step 518. As can be appreciated, if only one response packet is received when the most recent request packet transmitted by the control module 202 contains the entire range of identification values, the control module 202 determines that the range is exhausted and the method stops executing, as shown at step 516. The situation when the most recent request packet does not contain the entire range of identification values will be discussed below.

Returning to step 510, if a plurality of response packets are received by the control module 202, then the control module 202 divides the previous range of identification values into a first subrange of identification values and a second subrange of identification values, as shown at step 520. It is noted that the first subrange and the second subrange span the entire previous range of identification values. For example, if the previous range of identification values was 0 to 7 and more than one response packet was received, the control module 202 divides the range into two subranges, e.g., 0 to 3 and 4 to 7.

The control module 202 then generates a new request packet based on one of the subranges, and transmits the new request packet, as shown at step 522. It is appreciated that the control module 202 generates the new request packet in a manner similar to that described with respect to step 504, except that the start range value and the end range value will correspond to the first subrange range determined at step 520. The new request packet is then broadcasted by the transmitter 206.

The control module 202 waits for one or more response packets. If one or more response packets are received, the control module 202 will determine whether only one response packet was received, or whether multiple response packets were received, as shown at step 510. If more than one response packet is received, the control module 202 divides the previous range, e.g., 0 to 3, into a first subrange and a second subrange, e.g., 0 to 1, and 2 to 3, as shown at step 520. If only one response packet is received, however, the payload of the received response packet if analyzed, as was previously discussed and as shown at step 512. If the response packet is validated, the fob 102 is validated, as shown at step 514 and the method ends.

If the received response packet is not validated at step 512, then the control module 202 determines whether the range of identification values has been exhausted, as shown at step 518. If a request packet with the first subrange and a request packet with the second subrange have been transmitted, and both request packets resulted in only one respective response packet being received, then it can be deduced that there are no valid fobs 102 in the proximity to the vehicle and that the range of identification values has been exhausted. In this scenario, the method stops executing. If, however, the second subrange has not been included in a request packet, the control module 202 will generate a new request packet with the second subrange and will transmit the new request packet, as shown at step 526. The control module 202 will wait to receive a response, as shown at step 510.

Similarly, if in response to a request packet with the first subrange, no response packets are received at step 524, the control module 202 will generate a new request packet based on the second subrange. The new request module should result in at least one response packet. Based on the amount of response packets received, the control module 202 will either verify a single response packet, or will iteratively divide the second subrange and repeat the above listed steps.

As can be appreciated, the method shown in FIG. 5 will iteratively execute until a fob 102 is validated or until the control module 202 determines that there are no valid fobs 102 in the vicinity of the vehicle.

The following use cases illustrate examples of validating fobs. The following examples all assume a range of identification values ranging from 0 to 15. The exemplary fobs will be listed with their respective unique identification values in parenthesis. Further, the examples assume that the locations are verified.

Example 1

Fob(#1) is in the vicinity of the vehicle. The first request packet indicates the range (0,15). Fob(#1) is in the range and generates a response packet. No other fobs respond. Fob(#1) can be validated.

Example 2

Fob(#1) and Fob(#15) are in the vicinity of the vehicle. The first request packet indicates the range (0, 15). Both Fob (#1) and Fob(#15) are in the range and both generate response packets, thereby resulting in a collision. The control module 202 then divides the range (0, 15) into a first subrange (0, 7) and a second subrange (8, 15), and generates a request packet with the first subrange (0, 7). Fob(#1) is in the subrange (0, 7) and generates a response packet. Fob(#15) is not in the first subrange (0, 7) and does not generate a response packet. Thus, Fob(#1) can be validated.

Example 3

Fob(#1) and Fob(#5) are in the vicinity of the vehicle. The first request packet indicates the range (0, 15). Both Fob (#1) and Fob(#3) are in the range (0, 15) and both generate response packets, thereby resulting in a collision. The control module 202 then divides the range (0, 15) into a first subrange (0, 7) and a second subrange (8, 15), and generates a request packet with the first subrange (0, 7). Both Fob (#1) and Fob(#5) are in the subrange (0, 7) and both generate response packets, thereby resulting in another collision. The control module 202 then divides the subrange (0, 7) into a first subrange (0, 3) and a second subrange (4, 7), and generates a request packet with the first subrange (0, 3). Fob(#1) is in the subrange (0, 3) and generates a response packet. Fob(#5) is not in the first subrange (0, 3) and does not generate a response packet. Thus, Fob(#1) can be validated.

Example 4

In this example, the fobs transmit at a first time slot if the unique identification value is odd; and at a second time slot if the unique identification value is even. In the example, Fob (#1) and Fob(#2) are in the vicinity of the vehicle. The first request packet indicates the range (0, 15). Both Fob (#1) and Fob(#2) are in the range. Fob(#1) generates and transmits the response packet during the first time slot and Fob(#2) generates and transmits the response packet during the second time slot. Thus, while both generate response packets, there is no collision and Fob(#1) can be validated.

The foregoing examples illustrate the operation of the control module 202. It is appreciated that the examples are not intended to be limiting, as more than two key fobs can respond to a request packet at the same time. Further, the range of identification values may be much greater than 0 to 15. For example, in some embodiments, the range of identification values may vary from 0 to $2^{18}$, i.e., 262,144. In such a range, the maximum amount of iterations to validate a fob is 19.

Figure 6:
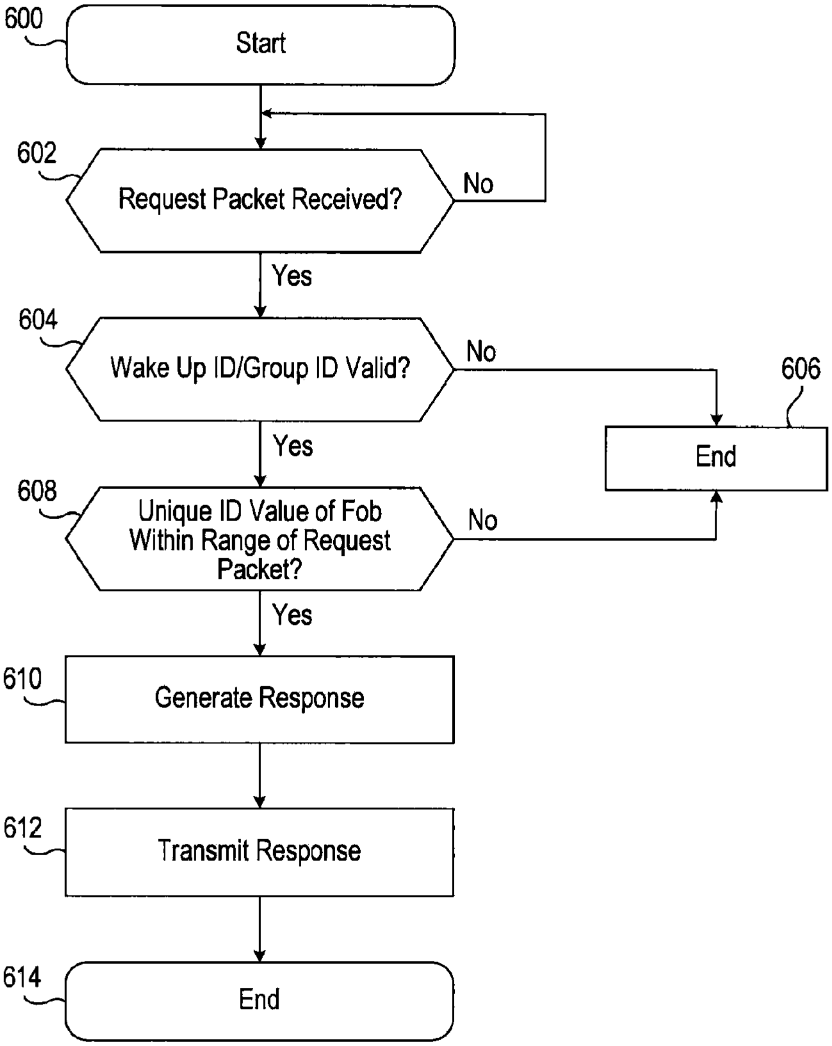
FIG. 6 a flow chart illustrating exemplary steps for responding to a request packet.

Referring now to FIG. 6, an exemplary method that can be executed by the response module 222 of a fob 102 is disclosed. As discussed, the fob 102 includes a transceiver 224. The transceiver 224 is typically inactive but listens for packets until a packet is received, as shown at step 602. When a packet it received, the response module 222 reads a section of the received packet corresponding to a section where the wake-up ID value and group ID value are typically found. The response module 222 then compares the values obtained from the received packet with the fob data stored in the memory 226. If the wake-up ID value and the group ID value obtained from the memory 226 of the fob 102 do not match the values read from the received packet, the response module 222 does not generate or transmit a response packet, as shown at step 606.

If, however, the wake-up ID value and the group ID value obtained from the received packet are valid, the response module 222 will read the start fob identification value and the end fob ID value from the respective start fob ID field 306 and the end ID fob field 308 of the received request packet 300. The response module 222 will then compare the unique identification value of the fob 102 with the start and end fob identification values, as shown at step 608. If the unique identification value does not fall within the range of identification values, then the response module 222 does not generate or transmit a response packet and the method stops executing, as shown at step 606.

If, however, the unique identification value of the fob 102 falls within the range of identification values, the response module 222 will generate a response packet, as shown at step 610. As previously discussed, in some embodiments the request packet includes a location code indicating a location of the fob or user in relation to the vehicle. The response module 222 uses the location code to encode a checksum value. The checksum value can be an agreed upon value that is stored in all of the fobs' memories 226 and the unlocking module's memory 208 of each vehicle 100 in the fleet. A response module 222 of a responding fob 102 will use an encryption algorithm, e.g., Hitag 2, to encrypt the checksum using the location code as a key. The response packet is generated with the encrypted checksum as the payload. The response packet is then transmitted to the unlocking module 200 by the transceiver 224 of the responding fob.

It is appreciated that the foregoing method is exemplary, and that variations of the method can be executed by the response module 222. Also, the steps shown can be separated into a multiple steps. Further, not all steps are required and the steps may be optional.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

What is claimed is:

1. A passive entry system comprising:

an unlocking module that is integrated in a vehicle of a first group of vehicles and configured to perform a key operation in a keyless environment, the unlocking module comprising:

a control module that determines a range of identification values, including a start of range value and an end of range value, that generates an authentication request packet based on the range of identification values and a first group identification value, and that broadcasts the request packet, wherein the first group identification value is common to the first group of vehicles; and a plurality of fobs that are in communication with the first group of vehicles and configured to trigger the unlocking module to perform the key operation, each fob having a unique identification value associated thereto and a second group identification value associated thereto, each fob comprising:

a fob transceiver that receives the request packet; and a response module that determines if the first group identification value corresponds to the second group identification value, and that determines whether the unique identification value of the corresponding fob falls within the range of identification values only if the first group identification value corresponds to the second group identification value, and that generates a response packet if the unique identification value falls within the range of identification values, wherein the fob transceiver transmits the response packet to the control module;

wherein the control module is configured to receive response packets from the plurality of fobs, analyze response packets received from fobs having even unique identification values separately from response packets received from fobs having odd unique identification values, and to perform the key operation based on one of the received response packets.

2. The system of claim 1 wherein the control module performs the key operation when a response packet is received from only one fob.

3. The system of claim 1 wherein when the control module receives the response packets from more than one fob, the control module divides the range of identification values broadcasted in a previous request packet into a first subrange of identification values and a second subrange of identification values and generates a first new request packet based on the first subrange of identification values which is broadcasted by the control module.

4. The system of claim 3 wherein when the control module does not receive a response packet from any fobs after transmitting the first new request packet, the control module generates a second new request packet based on the second subrange of identification values.

5. The system of claim 4 wherein the control module iteratively adjusts the subranges of identification values and generates request packets based on the adjusted subranges until only one fob responds to the request packets.

6. The system of claim 1 wherein the unlocking module further comprises a proximity sensor that detects a presence of an object in proximity to the vehicle, wherein the control module transmits the request package upon the proximity sensor detecting the presence of the object.

7. The system of claim 6 wherein the request package includes a location identifier indicating a location of the object with respect to the vehicle sensed by the proximity sensor, and the response packet includes a response message that is based on the location identifier.

8. The system of claim 7 wherein the control module is configured to determine a fob location indicating a location of the fob transmitting a response packet, wherein the control module performs the unlocking operation when the fob location matches the location identifier.

9. The system of claim 1 wherein the fob transceiver of a particular fob is configured to transmit the response packet during a particular time slot of a plurality of time slots, wherein the particular time slot that the response packet is transmitted on is based on the value of the unique identification value of the particular fob such that said fobs having said even unique identification values transmit a response packet in a different time slot than said fobs having said odd unique identification values.

10. The system of claim 1, wherein the request packet includes a third group identification value, and each fob has a fourth group identification value;

wherein the third group identification value is common to a second group of vehicles that includes the first group of vehicles;

wherein the response module is configured to determine if the third group identification value corresponds to the fourth group identification value; and wherein the response module determines if the first group identification value corresponds to the second group identification value only if the third group identification value corresponds to the fourth group identification value.

11. A passive entry method comprising:

determining, at an unlocking module, a range of identification values, including a start of range value and an end of range value;

determining, at an unlocking module that is integrated in a vehicle of a first group of vehicles, a first group identification value that is common to the first group of vehicles;

generating, at the unlocking module, an authentication request packet based on the range of identification values and the first group identification value;

broadcasting, from the unlocking module, the request packet to a plurality of fobs, each fob having a unique identification value and a second group identification value associated thereto and being in communication with the first group of vehicles;

receiving, at one of the fobs of the plurality of fobs, the request packet;

determining, at the fob, whether the first group identification value corresponds to the second group identification value;

determining, at the fob, whether the unique identification value of the corresponding fob falls within the range of identification values only if the first group identification value corresponds to the second group identification value;

generating, at the fob, a response packet if the unique identification value falls within the range of identification values;

transmitting, from the fob, the response packet to the unlocking module;

receiving, at the unlocking module, response packets from the plurality of fobs;

analyzing, at the unlocking module, response packets corresponding to even unique identification values separately from response packets corresponding to odd unique identification values; and performing a key operation, at the unlocking module, based on one of the received response packets.

12. The method of claim 11 wherein the key operation is performed only when a response packet is received from only one fob.

13. The method of claim 11 further comprising dividing the range of identification values broadcasted in a previous request packet into a first subrange of identification values and a second subrange of identification values and generating a first new request packet based on the first subrange of identification values, wherein the dividing is done when the response packets are received from more than one fob and in response to one request packet.

14. The method of claim 13 further comprising generating a second new request packet based on the second subrange of identification values when a response packet is not received from any of the plurality of the fobs after transmitting the first new request packet.

15. The method of claim 14 further comprising iteratively adjusting the subranges of identification values and generating request packets based on the adjusted subranges until only one fob responds to the request packets.

16. The method of claim 11 further comprising detecting a presence of an object in proximity to the vehicle and transmitting the request packet upon detecting the presence of the object.

17. The method of claim 16 wherein the request package includes a location identifier indicating a location of the detected object with respect to the vehicle, and the response packet includes a response message that is encoded based on the location identifier.

18. The method of claim 17 further comprising determining a fob location indicating a location of the fob transmitting a response packet, and performing the key operation when the fob location matches the location identifier.

19. The system of claim 11 further comprising transmitting said response packets corresponding to said even unique identification values in a different time slot than said response packets corresponding to said odd unique identification values.

20. The method of claim 11, further comprising the steps:

determining, at the unlocking module, a third group identification value that is common to a second group of vehicles, wherein the second group of vehicles includes the first group of vehicles and the request packet is further based on the third group identification value; and determining, at the fob, whether the third group identification value corresponds to a fourth group identification value that each fob includes;

wherein the step of determining whether the first group identification value corresponds to the second group identification value is performed only if the third group identification value corresponds to the fourth group identification value.

* * * * *